US012196962B2

(12) United States Patent
Yamaguchi et al.

(10) Patent No.: US 12,196,962 B2
(45) Date of Patent: Jan. 14, 2025

(54) VIRTUAL IMAGE DISPLAY DEVICE AND OPTICAL UNIT

(71) Applicant: SEIKO EPSON CORPORATION, Tokyo (JP)

(72) Inventors: Tokito Yamaguchi, Azumino (JP); Mitsutaka Ide, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 549 days.

(21) Appl. No.: 17/513,623

(22) Filed: Oct. 28, 2021

(65) Prior Publication Data

US 2022/0137406 A1 May 5, 2022

(30) Foreign Application Priority Data

Oct. 29, 2020 (JP) .................................. 2020-181054

(51) Int. Cl.
*G02B 27/01* (2006.01)
*G02B 5/04* (2006.01)
*G02B 17/08* (2006.01)

(52) U.S. Cl.
CPC .............. *G02B 27/017* (2013.01); *G02B 5/04* (2013.01); *G02B 17/0816* (2013.01); *G02B 2027/0178* (2013.01)

(58) Field of Classification Search
CPC ... G02B 2027/0105–0198; G02B 27/01–0189; G02B 5/00–32; G02B 17/00–0896
See application file for complete search history.

(56) References Cited

U.S. PATENT DOCUMENTS

| 5,687,025 | A | 11/1997 | Nanba | |
|---|---|---|---|---|
| 2012/0162549 | A1* | 6/2012 | Gao | G02B 6/003 359/651 |
| 2018/0239141 | A1* | 8/2018 | Cakmakci | G02B 17/08 |
| 2019/0179409 | A1* | 6/2019 | Jones | G02B 27/0172 |
| 2020/0018966 | A1 | 1/2020 | Komatsu et al. | |
| 2021/0033868 | A1* | 2/2021 | Inoguchi | G02B 17/0856 |
| 2021/0063749 | A1 | 3/2021 | Takeda et al. | |

FOREIGN PATENT DOCUMENTS

| CN | 110703441 A | 1/2020 |
|---|---|---|
| JP | H09-043536 A | 2/1997 |
| JP | 2001-242412 A | 9/2001 |
| JP | 2021-033154 A | 3/2021 |

\* cited by examiner

*Primary Examiner* — Bao-Luan Q Le
*Assistant Examiner* — Christopher A Lamb, II
(74) *Attorney, Agent, or Firm* — Oliff PLC

(57) ABSTRACT

An optical unit includes a projection lens, a prism configured to guide the image light from the projection lens, and a mirror member configured to reflect, toward a pupil position, the image light from the prism, wherein the prism includes a first surface where the image light from the projection lens is incident while being transmitted, a second surface at which the image light that passed through the first surface is reflected, and a third surface at which the image light that passed through the second surface is reflected toward the second surface, and the image light reflected at the third surface is emitted while being transmitted through the second surface.

16 Claims, 7 Drawing Sheets

VIRTUAL IMAGE DISPLAY DEVICE AND OPTICAL UNIT

The present application is based on, and claims priority from JP Application Serial Number 2020-181054, filed Oct. 29, 2020, the disclosure of which is hereby incorporated by reference herein in its entirety.

BACKGROUND

1. Technical Field

The present disclosure relates to a virtual image display device such as a head-mounted display and an optical unit incorporated therein.

2. Related Art

As a virtual image display device that enables formation and observation of a virtual image such as a head-mounted display, it is conceivable that there exist various types of virtual image display devices in which image light from a display element is guided to the pupil of an observer by an optical element such as a mirror.

The eyepiece optical system described in JP-A-9-43536 includes an image display device, a relay optical system for forming an intermediate image of a display image by the image display device, and an eyepiece reflective surface for guiding a light beam from the intermediate image to an eye point. Here, the relay optical system includes a refractive optical system and a relay reflective surface. The relay reflective surface and the eyepiece reflective surface are eccentric and have an anamorphic aspherical shape.

In the apparatus disclosed in JP-A-9-43536, aberrations are corrected by making the relay reflective surface and the eyepiece reflective surface anamorphic aspherical surfaces, but when this apparatus is applied to a system including, for example, an eccentric optical system, the correction cannot be made sufficiently, resulting in insufficient resolution performance. In addition, it is also conceivable to improve the resolution performance by increasing the number of lenses, but in this case, the optical system becomes large, and there is a possibility that this is not suitable for an apparatus such as a head-mounted display for which there is a strong demand for miniaturization.

SUMMARY

A virtual image display device according to an aspect of the present disclosure, includes a display element, a projection lens configured to converge image light emitted from the display element, a prism configured to guide the image light emitted from the projection lens, and a mirror member configured to reflect, toward a pupil position, the image light emitted from the prism, wherein the prism includes a first surface where the image light from the projection lens is incident while being transmitted, a second surface at which the image light that passed through the first surface is reflected, and a third surface at which the image light that passed through the second surface is reflected toward the second surface, and the image light reflected at the third surface is emitted while being transmitted through the second surface.

DESCRIPTION OF EXEMPLARY EMBODIMENTS

First Embodiment

Hereinafter, an example of a virtual image display device according to a first embodiment of the present disclosure and an optical unit incorporated therein will be described with reference to the drawings.

Figure 1:
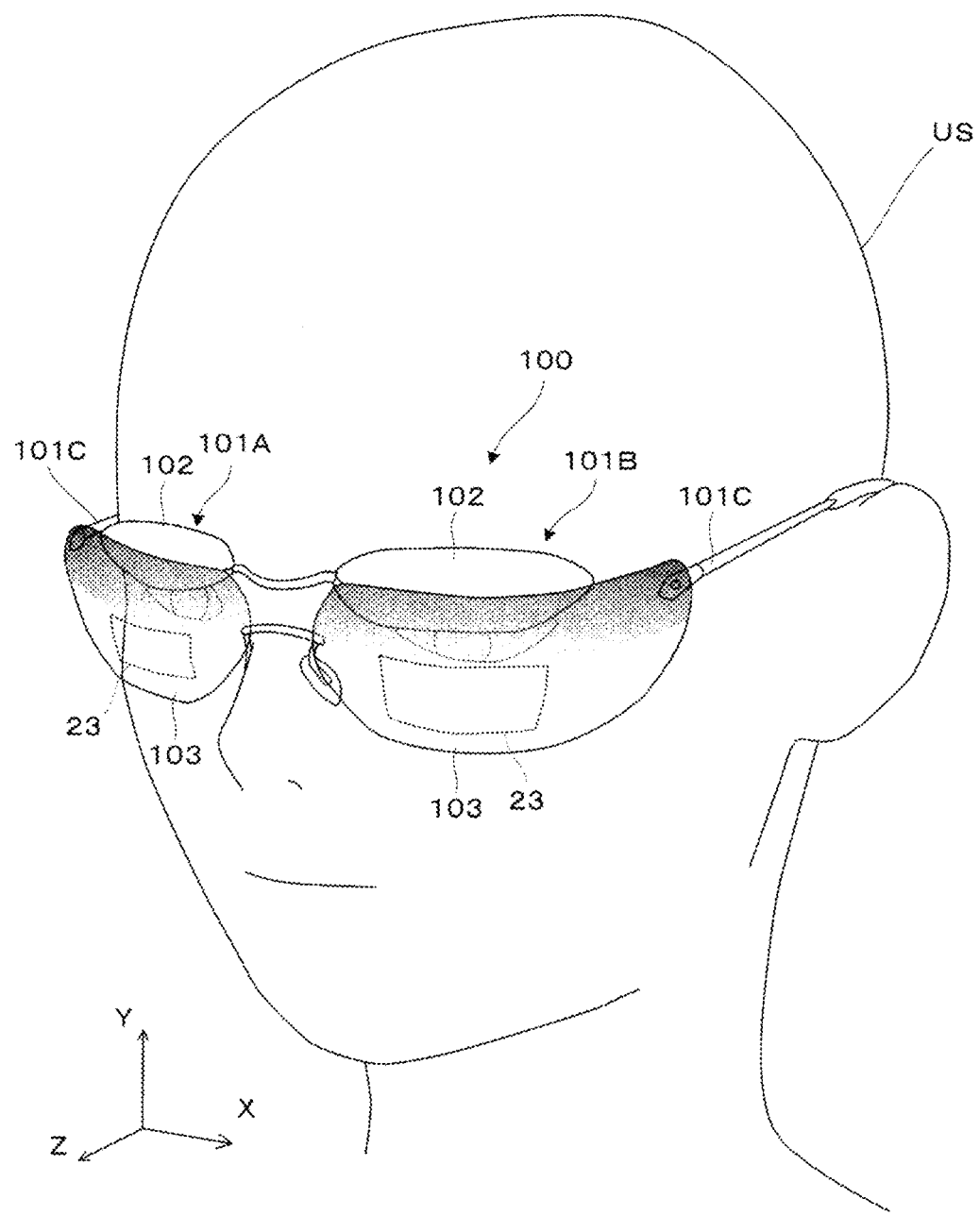
FIG. 1 is an external perspective view illustrating a mounting state of a virtual image display device according to a first embodiment.

As illustrated in FIG. 1, a virtual image display device 100 according to a first embodiment is a head-mounted display (HMD) having an external appearance like eyeglasses, and causes an observer or a user US wearing the virtual image display device 100 to recognize an image as a virtual image. In FIG. 1, X, Y, and Z are orthogonal coordinate systems, the +X direction corresponds to a lateral direction in which both eyes of a user US wearing the virtual image display device 100 are arranged, the +Y direction corresponds to an upward direction orthogonal to the lateral direction in which both eyes of the user US are arranged, and the +Z direction corresponds to a forward direction or a front direction of the user US.

The virtual image display device 100 includes a first display device 101A that forms a virtual image for the right eye, a second display device 101B that forms a virtual image for the left eye, and a temple-shaped support device 101C that supports both display devices 101A and 101B. The first display device 101A includes an optical unit 102 disposed at an upper portion thereof and an appearance member 103 that has a spectacle lens shape and covers the entirety. Similarly, the second display device 101B includes an optical unit 102 disposed at the upper portion thereof and an appearance member 103 that has a spectacle lens shape and covers the entirety. The support device 101C supports both the display devices 101A and 101B on the upper end side of the appearance member 103 by a member (not illustrated) disposed behind the appearance member 103. The second display device 101B for the left eye has the same structure as the first display device 101A. Hereinafter, the first display device 101A will be described, and the description of the second display device 101B will be omitted.

Figure 2:
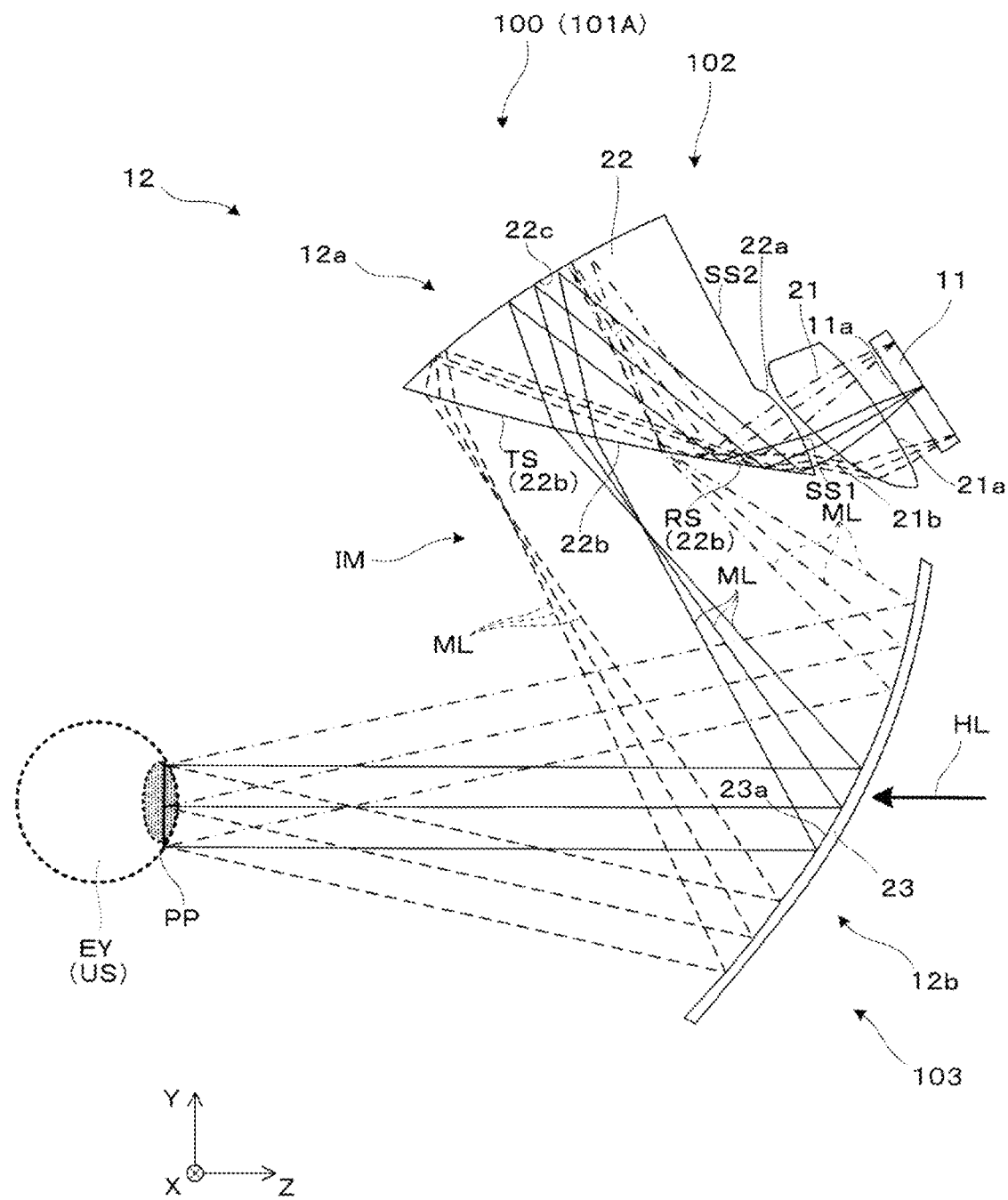
FIG. 2 is a side cross-sectional view illustrating an optical system of the virtual image display device in FIG. 1.

As illustrated in FIG. 2, the first display device 101A for the right eye includes a display element 11 and an optical unit 12, as optical elements. Of these, the optical unit 12 includes a light-guiding system 12a and a mirror member 12b. The optical unit 12 is also referred to as a light-guiding device from the viewpoint of guiding image light ML from the display element 11 to the pupil position PP.

The display element 11 is a self-luminous display device represented by, for example, an organic EL (Organic Electro-Luminescence), an inorganic EL, an LED array, an organic LED, a laser array, and quantum dot light-emitting element, or the like, and forms a color still image or moving image on a two dimensional display surface 11*a*. The display element 11 is driven by a drive control circuit (not illustrated) to perform a display operation. When an organic EL display or display device is used as the display element 11, an organic EL control unit is provided. When a quantum dot light-emitting display is used as the display element 11, light from a blue light-emitting diode (LED) is passed through a quantum dot film to emit green or red light. The display element 11 is not limited to a self-luminous display element, and may be configured by an LCD and other light modulation element, and may form an image by illuminating the light modulation element with a light source such as a backlight. As the display element 11, an LCOS (Liquid crystal on silicon, LCoS is a registered trademark), a digital micro-mirror device, or the like may be used instead of the LCD.

The optical unit (light-guiding device) 12 includes a light-guiding system 12*a* that guides the image light ML emitted from the display element 11, and a mirror member 12*b* that reflects the image light ML emitted from the light-guiding system 12*a* toward the pupil position PP. In the illustrated example, the optical unit 12 includes a projection lens (projection prism) 21, a prism 22, and a see-through mirror 23. Of these, the projection lens 21 and the prism 22 function as a light-guiding system 12*a*, and the see-through mirror 23 functions as a mirror member 12*b*.

Hereinafter, the projection lens 21, the prism 22, and the see-through mirror 23 constituting the optical unit 12 will be described in more detail.

First, among the constituent components of the light-guiding system 12*a*, the projection lens (projection prism) 21 is a single lens (single prism) and has an incident surface 21*a* and an emission surface 21*b* as its constituent optical surfaces. The projection lens 21 converges the image light ML emitted from the display element 11.

In the light-guiding system 12*a*, the prism 22 is formed by providing a mirror deposition surface on a part of an optically transparent prism member (main body portion). That is, the prism 22 is a refractive/reflective optical member having a function of combining a mirror and a lens, and guides the image light ML emitted from the projection lens 21. The prism 22 receives the image light ML from the projection lens 21, guides the image light ML inside, and emits the image light ML. Therefore, the prism 22 has, as constituent surfaces, a first surface 22*a* that is a transmissive surface, a second surface 22*b* that is a reflective surface (internal reflective surface) and is also a transmissive surface, and a third surface 22*c* that is a reflective surface (internal reflective surface). Among them, the first surface 22*a* is an incident surface at which the image light ML is incident, and the second surface 22*b* is an emission surface from which the image light ML is emitted. In particular, the second surface 22*b* includes a reflective area RS that functions as a reflective surface and a transmissive area TS that functions as a transmissive surface. That is, on the second surface 22*b*, there are the reflective area RS that reflects the image light ML and a transmissive area TS that transmits the image light ML. In the illustrated example, on the second surface 22*b*, the reflective area RS is provided closer to the first surface 22*a* (closer to the projection lens 21) and the transmissive area TS is provided closer to the third surface 22*c* (farther from the projection lens 21). However, an overlapping area of the reflective area RS and the transmissive area TS may exist on the second surface 22*b*. By providing the overlapping area, the prism 22 can be miniaturized.

In the illustrated example, the first surface 22*a* has a curved surface SS1 having a convex shape toward the projection lens 21 as a surface having an optical function, and has a flat surface SS2 as a coupling surface coupling the third surface 22C and the curved surface SS1, as a surface having no optical function. In this case, the curved surface SS1 of the first surface 22*a* is located lower (−Y side) than the flat surface SS2.

In the prism 22 having the first surface 22*a*, the second surface 22*b*, and the third surface 22*c* as described above, the image light ML emitted from the projection lens 21 first enters while being transmitted at the first surface 22*a* that is the incident surface of the prism 22, and then is reflected by the reflective area RS of the second surface 22*b*. Here, in the illustrated example, in the reflection in the reflective area RS, the incident angle, relative to the second surface 22*b*, of the image light ML that passed through the first surface 22*a* is adjusted so as to satisfy the total reflection requirement. That is, the prism 22 totally reflects (internally reflects) the image light ML that passed through the first surface 22*a* at the second surface 22*b*. The image light ML that passed through the reflective area RS of the second surface 22*b* is further reflected by the third surface 22*c* and travels toward the second surface 22*b* again. However, the image light ML travels toward the transmissive area TS of the second surface 22*b*. Further, at this time, the incident angle of the image light ML relative to the second surface 22*b* is adjusted for the image light ML to transmit through the second surface 22*b*. Therefore, the image light ML is emitted from the prism 22 by transmitting (passing) through the transmissive area TS. That is, in this case, the second surface 22*b* functions as the emission surface of the prism 22. As described above, the second surface 22*b* functions as a transmissive/reflective surface that transmits or reflects the image light ML according to the incident angle. In other words, regarding the emission of the image light ML, the prism 22 emits while transmitting the image light ML reflected by the third surface 22*c* at the second surface 22*b* (transmissive area TS). That is, the prism 22 emits the image light ML toward the see-through mirror 23 disposed in the rear stage of the optical path by transmitting the image light ML at the second surface 22*b*.

In the present embodiment, transmission (refraction) and reflection are repeated in the prism 22, thereby increasing the number of surfaces for aberration correction and improving the optical function. That is, the prism 22 enhances the function of aberration correction (in particular, the function of correcting eccentric aberration) together with the projection lens 21 that is another optical element constituting the virtual image display device 100.

The projection lens 21 and the prism 22 constituting the light-guiding system 12*a* have, for example, asymmetry with respect to the vertical direction, that is, the Y direction, and symmetry with respect to the lateral direction, that is, the X direction. Further, each of the optical surfaces (the incident surface 21*a*, the emission surface 21*b*, the first surface 22*a*, the second surface 22*b*, and the third surface 22*c*) of the projection lens 21 and the prism 22 can be, for example, a free curved surface or an aspherical surface. By forming each surface as a free curved surface or an aspherical surface, it is possible to reduce aberration. In particular, when a free curved surface is used, it is easy to reduce aberration of the optical unit 12 that is an off-axis optical system or a non-coaxial optical system described later.

Moreover, the single lens constituting the projection lens 21 and the main body portion of the prism 22 are made of, for example, resin, but may be made of glass. For example, the prism 22 may be formed by forming a main body portion of COP (cycloolefin polymer) and providing a portion to be a third surface 22c by forming a mirror deposition surface on a part of surfaces of the main body portion.

On the other hand, the see-through mirror 23 constituting the mirror member 12b is, so as to function as a front mirror, a plate-shaped optical member that covers the pupil position PP where the eye EY or the pupils are arranged and that has a concave shape toward the pupil position PP. The see-through mirror 23 has a reflective surface 23a on the side close to the prism 22 and the pupil position PP, that is, on the inner side of the concave shape, among the optical surfaces arranged on the light path. In addition, the see-through mirror 23 (reflective surface 23a) is a transmission type reflective element which transmits a part of light at the time of reflection, and allows the external light HL to be visually recognized while being superimposed on the image light ML, that is, allows see-through viewing.

The main body portion of the see-through mirror 23 is made of, for example, resin, but may be made of glass. The see-through mirror 23 is formed by providing one layer or two or more layers of a mirror film as a vapor deposition film on a resin-made or glass-made light transmitting member to form a reflective surface 23a. In addition, in order to make the shape, size, and weight of the see-through mirror 23 appropriate, it is conceivable to make the thickness about 2 mm, for example.

Although not illustrated in detail, the projection lens 21 and the prism 22 are housed together with the display element 11 in a case (not illustrated) made of a light-shielding material, and the see-through mirror 23 is supported via, for example, a support plate provided in the case. As described above, for example, the appearance member 103 supported by the the support device 101C illustrated in FIG. 1 is constituted.

Hereinafter, light guiding, by the optical unit 12 as the light guiding device, of the image light ML emitted from the display element 11 will be briefly described with reference to FIG. 2.

First, the projection lens 21 causes the image light ML emitted from the display element 11 to be incident while being refracted at the incident surface 21a, and causes the image light ML to be emitted while being refracted at the emission surface 21b. As a result, the projection lens 21 converges the image light ML in a state close to a parallel light flux and emits the image light ML toward the prism 22. Next, as described above, the prism 22 causes the image light ML emitted from the projection lens 21 to be incident while being refracted at the first surface 22a as the incident surface, to be reflected (totally reflected) at the reflective area RS of the second surface 22b, to be reflected at the third surface 22c as the internal reflective surface, and to be emitted from the transmissive area TS of the second surface 22b as the emission surface while being refracted. Finally, the see-through mirror 23 reflects, at the reflective surface 23a, the image light ML emitted from the prism 22 toward the pupil position PP. The pupil position PP is a position where the image light ML from each point on the display surface 11a is incident so as to be superimposed from an angle direction corresponding to the position of each point on the display surface 11a in a predetermined divergent state or parallel state. The illustrated optical unit 12 has a field of view (FOV) of 44°. The display area of the virtual image by the optical unit 12 is rectangular, and the above-mentioned 44° is in the diagonal direction.

On the other hand, the external light HL transmits through the see-through mirror 23 and is emitted from the reflective surface 23a. That is, since the the reflective surface 23a has optical transparency, the virtual image can be superimposed on the external image.

Note that in the above example, the optical unit 12 is an off-axis optical system. That is, the projection lens 21, the prism 22, and the see-through mirror 23 constituting the optical unit 12 are arranged so as to form an off-axis optical system. The optical unit 12 being an off-axis optical system means that a light path is bent as a whole before and after a light beam is incident on at least one reflective surface or refractive surface in the optical element 21, 22, 23 constituting the optical unit 12. In the illustrated example, the optical axis is bent while extending along a plane parallel to the Y-Z plane. That is, in the optical unit 12, by bending the optical axis along the Y-Z plane, the optical elements 21, 22, 23 are also arranged along the Y-Z plane. The optical axis of the optical unit 12 that is the above-described off-axis optical system, is arranged in a Z-shape, viewed in cross-section, after reflection at the reflective area RS of the second surface 22b. That is, in the drawing, a light path from the second surface 22b (reflective area RS) of the prism 22 to the third surface 22c, a light path from the third surface 22c to the see-through mirror 23, and a light path from the see-through mirror 23 to the exit pupil EP, are arranged to be folded back in two steps in a Z-shape.

In the light path of the image light ML illustrated in the drawing, the intermediate image IM is formed between the prism 22 and the see-through mirror 23.

Figure 3:
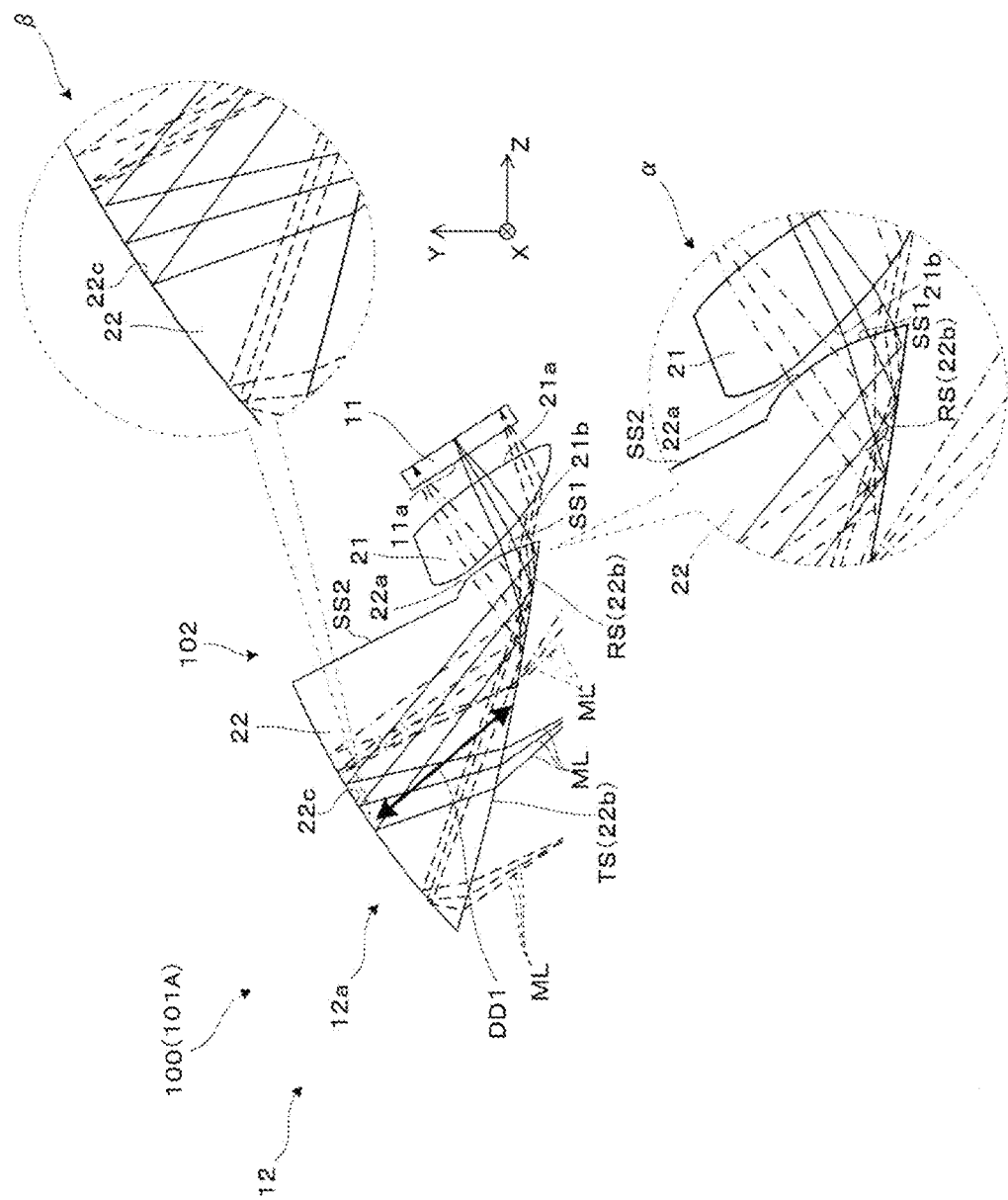
FIG. 3 is a side cross-sectional view conceptually illustrating a structure of a prism.

Hereinafter, the shape feature of the prism 22 will be further described with reference to FIG. 3. FIG. 3 is a side cross-sectional view conceptually illustrating a structure of the prism 22, and illustrates the reflective area RS of the second surface 22b and the third surface 22c that are reflective surfaces (internal reflective surfaces) in a partially enlarged manner in the drawing. To be more specific, in FIG. 3, the state of reflection (total reflection) in the reflective area RS of the second surface 22b is illustrated in a partially enlarged manner as a state α, and the state of reflection (mirror surface reflection) in the third surface 22c is illustrated in a partially enlarged manner as a state β. As illustrated, in the second surface 22b, the reflective area RS that reflects the image light ML has a concave shape, and the third surface 22c also has a concave shape. In other words, the prism 22 has two concave reflective surfaces. Accordingly, the virtual image display device 100 according to the present embodiment can improve the performance of aberration correction or reduce the load of aberration correction by suppressing the power of each reflective surface, as compared with a case where a portion corresponding to the prism 22 is configured by one concave reflective surface.

Further, as illustrated by a two-way arrow DD1 in FIG. 3, it is desirable that the second surface 22b and the third surface 22c are separated from each other to some extent. Here, the distance from the second surface 22b to the third surface 22c indicated by the two-way arrow DD1 means a distance between the origins of the optical surfaces forming the second surface 22b and the third surface 22c, respectively, and it is desirable that the distance falls within any of the ranges from 5 mm to 15 mm, for example. Since there is provided such a certain distance, aberration correction by the concave surface can be performed at a position where the light beam of the image light ML spreads away from the intermediate image IM (see FIG. 2) on the emission side of the second surface 22b.

Figure 4:
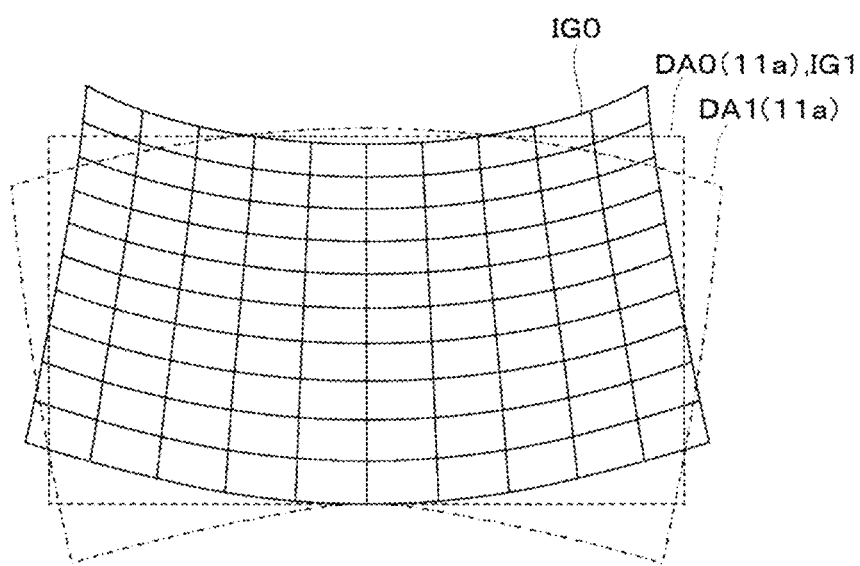
FIG. 4 is a diagram illustrating forced distortion of a display image formed on a display element.

Hereinafter, distortion in the virtual image display device 100 will be described with reference to FIG. 4. As illustrated in FIG. 4, the original projection image IG0 illustrating the imaging state by the optical unit 12 has a relatively large distortion. Since the optical unit 12 is an off-axis optical system, it is not easy to remove distortion such as trapezoidal distortion. Therefore, even when the distortion remains in the optical unit 12, in a case where the original display image is set as the DA0, the display image formed on the display surface 11a is set as the corrected image DA1 having the trapezoidal distortion which is previously distorted. That is, it is assumed that the image displayed on the display element 11 has an inverse distortion to cancel the distortion generated by the projection lens 21, the prism 22, and the see-through mirror 23. As a result, the pixel array of the projected image IG1 of the virtual image observed at the pupil position PP via the optical unit 12 can be a grid pattern corresponding to the original display image DA0, and the outline of the projected image IG1 can be rectangular. As a result, it is possible to suppress aberration as a whole including the display element 11 while allowing distortion aberration generated in the optical unit 12. In addition, when the external shape of the display surface 11a is rectangular, a margin is formed by forming a forced distortion, and additional information can be displayed in such a margin. The corrected image DA1 formed on the display surface 11a is not limited to one in which the forced distortion is formed by the image processing, and for example, the arrangement of the display pixels formed on the display surface 11a may correspond to the forced distortion. In this case, image processing for correcting the distortion is unnecessary. Furthermore, the display surface 11a may be curved to correct the aberration.

As described above, the virtual image display device 100 according to the present embodiment includes a display element 11, a projection lens 21 configured to converge image light ML emitted from a display element 11, a prism 22 configured to guide the image light ML emitted from the projection lens 21, and a see-through mirror 23 as a mirror member 12b configured to reflect, toward a pupil position PP, the image light ML emitted from the prism 22, wherein the prism 22 includes a first surface 22a at which the image light ML from the projection lens 21 is incident while being transmitted, a second surface 22b at which the image light ML that passed through the first surface 22a is reflected, and a third surface 22c at which the image light ML that passed through the second surface 22b is reflected toward the second surface 22b, and the image light ML that was reflected at the third surface 22c is emitted while being transmitted through the second surface 22b. That is, in the virtual image display device 100, in the prism 22 having the first surface 22a to the third surface 22c, the image light ML emitted from the projection lens 21 first is incident while being transmitted at the first surface 22a, is then reflected by the reflective area RS of the second surface 22b, is further reflected at the third surface 22c to be directed toward the second surface 22b again, and is emitted while being transmitted through the transmissive area TS of the second surface 22b. This makes it possible to increase the number of surfaces on which aberration can be corrected without increasing the size of the optical system, and to improve the resolution performance, as compared with, for example, an aspect in which only the image light ML is transmitted through a portion corresponding to the prism 22, or only one internal reflection is performed in addition to the transmission.

Second Embodiment

Hereinafter, a virtual image display device or the like according to a second embodiment of the present disclosure will be described. The virtual image display device according to the second embodiment is obtained by partially modifying the virtual image display device according to the first embodiment, and a description of common portions is omitted.

Figure 5:
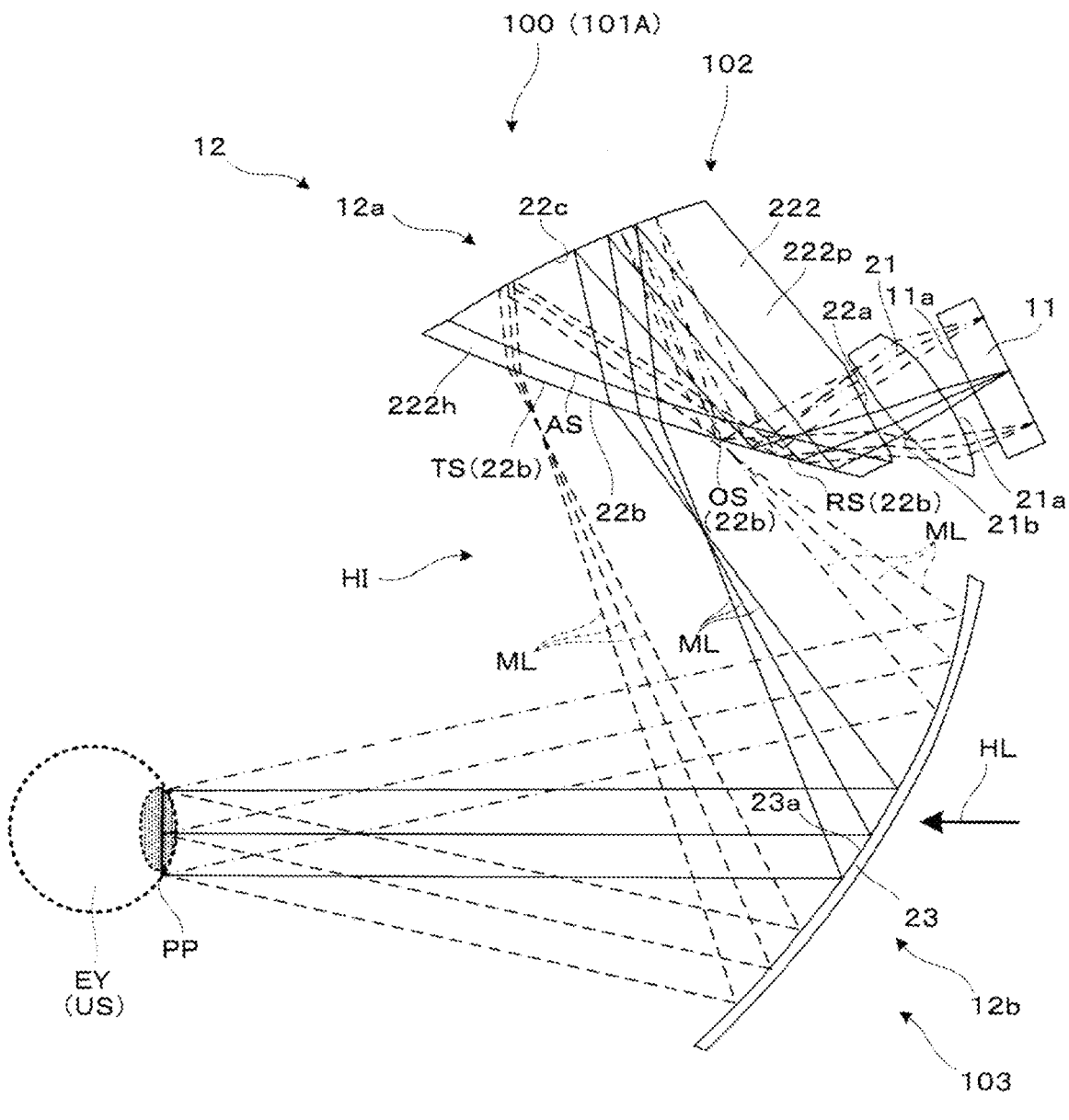
FIG. 5 is a side cross-sectional view illustrating an optical system of a virtual image display device according to a second embodiment.

An example of the optical system of the virtual image display device according to the present embodiment will be described with reference to FIGS. 5 and 6. FIG. 5 is a side cross-sectional view illustrating an optical system of a virtual image display device 100 according to the present embodiment, and corresponds to FIG. 2. Further, FIG. 6 is a side cross-sectional view conceptually illustrating a structure of a prism 222 that constitutes the virtual image display device 100 according to the present embodiment.

Figure 6:
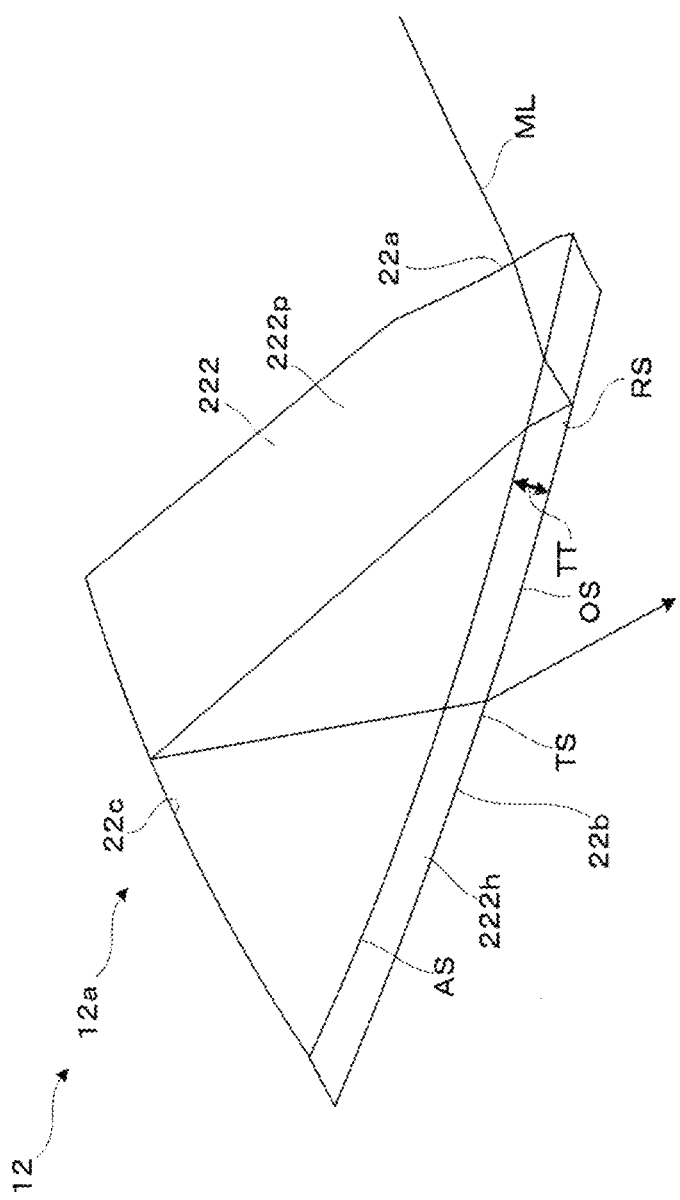
FIG. 6 is a side cross-sectional view conceptually illustrating a structure of a prism.

As illustrated in FIGS. 5 and 6, the present embodiment differs from the aspect illustrated in the first embodiment in that the prism 222 has a laminated structure in which a high refractive member 222h is attached to a main body portion 222p.

Hereinafter, the structure of the prism 222 will be described in more detail. In the prism 222, as in the first embodiment, for example, the main body portion 222p is formed of COP, and a high refractive member 222h formed of polycarbonate, OKP (optical polyester), or the like having a higher refractive index than COP is attached to the main body portion 222p. In particular, in the illustrated example, the second surface 22b of the prism 222 is formed by the high refractive member 222h. In other words, the prism 222 forms the second surface 22b with the high refractive member 222h having a relatively higher refractive index than the main body portion 222p. As in the case of the first embodiment, the third surface 22c is provided by providing a mirror deposition surface on a part of the main body portion 222p.

As described above, the prism 222 has a laminated structure in which the main body portion 222p and the high refractive member 222h, which are members having different refractive indices, are combined.

With the above-described laminated structure, as compared with the case illustrated in the first embodiment, for example, the light path of the image light ML, as illustrated in FIG. 6, increases the number of passages such that the light path additionally passes (transmits) through the laminated surface AS, in the second surface 22b, between the main body portion 222p and the high refractive member 222h three times in total including two times of passage (refraction) before and after reflection at the reflective area RS and one time of passage (refraction) before transmission at the transmissive area TS. In this case, the optical element (high refractive member 222h) to be attached to the main body portion 222p is made of a material having a higher refractive index than the main body portion 222p (combining members having different in refractive index), so that the condition of total reflection of the image light ML in the reflective area RS of the second surface 22b can be relaxed, and the optical system can be further miniaturized. In addition, it is considered that the thickness TT of the high refractive member 222h is, for example, about 1 mm.

Further, here, for example, as illustrated in FIG. 5, in the second surface 22b formed by the high refractive member 222h, there is an overlapping area OS of the reflective area RS that reflects the image light ML and the transmissive area TS that transmits the image light ML.

Furthermore, for example, the laminated surface AS of the main body portion 222p and the high refractive member 222h may be made a curved surface different from the reflective area RS of the second surface 22b to further increase the transmissive surface (refractive surface) and improve aberration correction and resolution performance.

For the bonding of the main body portion 222p and the high refractive member 222h at the laminated surface AS, it is considered that a high refractive material (polycarbonate or the like) 222h to be the high refractive member 222h is bonded to the main body portion 222p by an acrylic or epoxy adhesive or the like. In addition, it is conceivable to adopt, for positioning at the time of bonding, positioning by an outer shape of each optical surface, positioning provided with a positioning mechanism, or the like.

As described above, in the present embodiment, the prism 222 has a laminated structure in which the high refractive member 222h is laminated to the main body portion 222p. Accordingly, the virtual image display device 100 can miniaturize the optical system and further increase the number of aberration correction surfaces.

Modified Examples and Others

The present disclosure is described according to the above embodiments, but the present disclosure is not limited to the above embodiments. The present disclosure may be implemented in various modes without departing from the gist of the present disclosure, and, for example, the following modifications may be implemented.

Figure 7:
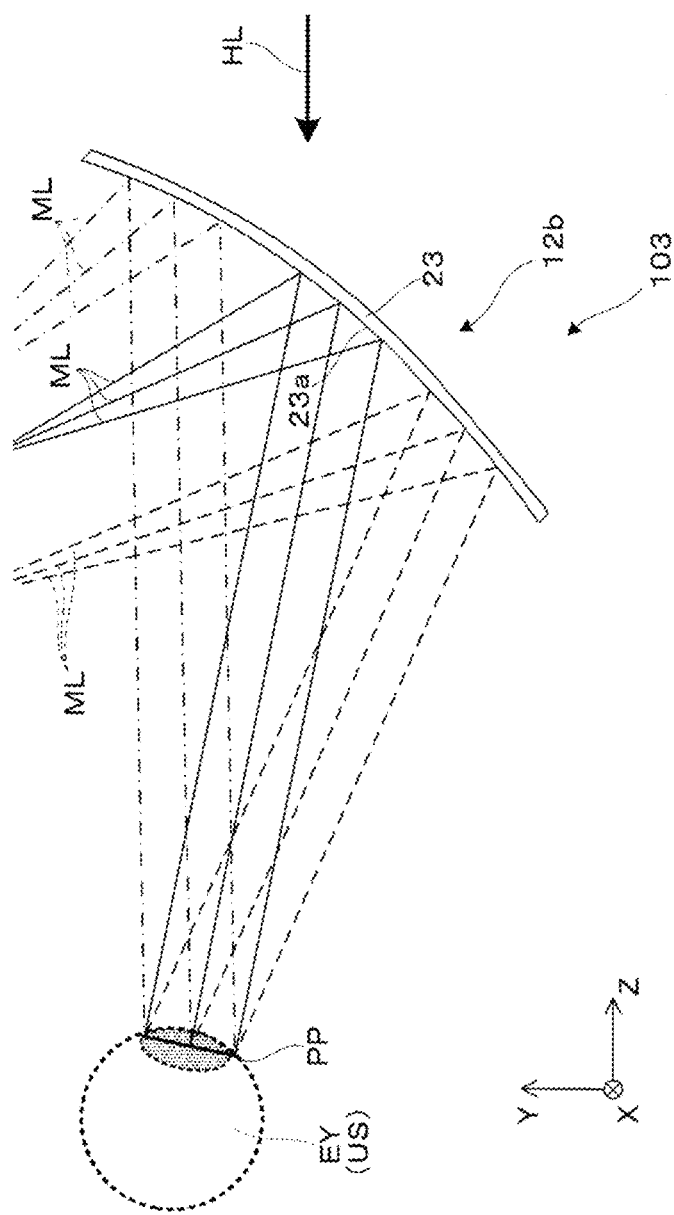
FIG. 7 is a side cross-sectional view illustrating an optical system of a virtual image display device according to a modified example.

In the virtual image display device 100 of the embodiment described above, the virtual image visually recognized by the image light ML is not limited to the case where the component to be recognized as the image (virtual image) of the central portion is in the state along the Z direction as illustrated in FIGS. 2 and 5, but the light path may be appropriately adjusted to be, for example, about −10° toward the Z direction, with the downward direction being negative as illustrated in FIG. 7. In other words, the see-through mirror 23 covering the front side (+Z side) of the pupil position PP may be disposed such that the emission optical axis extends inclined downward by about 10° with respect to the +Z direction. This is because the line-of-sight of a person is stabilized in a slightly downcast eye state in which the line of sight is inclined downward by about 10° from the horizontal direction. Note that the horizontal direction in the virtual image display device 100 is based on the assumption that the user US wearing the virtual image display device 100 is in an upright posture, relaxed, facing the front, and gazing at the horizontal direction or the horizontal line. The shape and posture of the head including the arrangement of the eyes, the arrangement of the ears, or the like of each user US wearing the virtual image display device 100 are various. However, by assuming an average head shape or head posture of the user US, an average direction can be set as a horizontal direction for the virtual image display device 100 of interest.

In the above description, the image light ML is totally reflected in the reflective area RS of the second surface 22b. However, for example, a mirror vapor deposition film may be formed in a portion or a part of the reflective area RS to perform reflection.

In addition, in the above description, for example, the size of the optical unit 12 in the plane direction or the Z direction may be arranged such that the distance from the pupil position PP to the see-through mirror 23 is from about 30 mm to 40 mm.

In addition to the case where the see-through mirror 23 is a concave plate member having a uniform thickness, the see-through mirror 23 may have, for example, asymmetry with respect to the vertical direction, that is, the Y direction, and symmetry with respect to the lateral direction, that is, the X direction, similar to the projection lens 21 and the prism 22. Furthermore, it is also conceivable that the surface shape of the see-through mirror 23 may be a free curved surface or an aspherical surface, for example.

In the virtual image display device 100 of the above-described embodiment, a self-luminous display device such as an organic EL element, an LCD, and other light modulation elements are used as the display element 11, but instead of this, a configuration using a laser scanner in which a laser light source and a scanner that is a polygon mirror or the like are combined is also possible. That is, the present disclosure can also be applied to a laser retina projection type head-mounted display.

A light control device that controls light by limiting transmitted light of the see-through mirror 23 may be attached on the external side of the see-through mirror 23. The light control device adjusts the transmittance electrically, for example. As the light control device, a mirror liquid crystal, an electronic shade, or the like can be used. The light control device may adjust the transmittance according to the external light illuminance. When the external light HL is blocked by the light control device, only the virtual image that is not affected by the external image can be observed. In addition, the virtual image display device of the present disclosure can be applied to a so-called closed type head-mounted display device (HMD) that blocks external light and allows only image light to be visually recognized. In addition, the virtual image display device of the present disclosure may also be compatible with a so-called see-through video product constituted by a virtual image display device and an imaging device.

In the above description, it is assumed that the virtual image display device 100 is used while being mounted on the head. However, the virtual image display device 100 described above can also be used as a hand-held display that is not mounted on the head but viewed into it like binoculars. That is, according to an aspect of the present disclosure, the head-mounted display includes a hand-held display.

In the above description, light is guided in the vertical direction or the Y direction, but light may be guided in the lateral direction or the X direction.

The virtual image display device according to a specific aspect, includes a display element, a projection lens configured to converge image light emitted from the display element, a prism configured to guide the image light emitted from the projection lens, and a mirror member configured to reflect, toward a pupil position, the image light emitted from the prism, wherein the prism includes a first surface where the image light from the projection lens is incident while being transmitted, a second surface at which the image light that passed through the first surface is reflected, and a third surface at which the image light that passed through the second surface is reflected toward the second surface, and the image light reflected at the third surface is emitted while being transmitted through the second surface.

In the virtual image display device, in the prism having the first surface to the third surface, the image light emitted from the projection lens first enters while being transmitted from the first surface, is then reflected by the second surface, is further reflected by the third surface to be directed toward the second surface again, and is emitted while being transmitted through the second surface. This makes it possible to increase the number of surfaces on which aberration can be corrected without increasing the size of the optical system and to improve the resolution performance, as compared with, for example, an aspect in which only light is transmitted through a prism or only one internal reflection is performed by a prism in addition to the transmission.

In a specific aspect, the prism reflects, by total reflection at the second surface, the image light that passed through the first surface. In this case, the image light can be reflected at the second surface with high efficiency.

In another aspect, of the second surface, a reflective area that reflects image light has a concave shape.

The third surface has a concave shape. In this case, the performance of aberration correction can be improved, and the burden of aberration correction can be shared between the second surface and the third surface.

In still another aspect, in the second surface, there is an overlapping area of a reflective area that reflects the image light and a transmissive area that transmits the image light. In this case, the prism can be further miniaturized.

In still another aspect, in the second surface, the reflective area that reflects the image light is provided at a position closer to the projection lens than the transmissive area that transmits the image light.

In still another aspect, the prism has a laminated structure in which members having different refractive indexes are combined. In this case, light path control and aberration correction, which use the refractive index difference, can be performed.

In still another aspect, the prism forms the second surface with a high refractive member having a relatively high refractive index. In this case, reflection and transmission at the second surface can be adjusted by the high refractive member.

In still another aspect, the mirror member is a see-through mirror configured to reflect the image light emitted from the prism toward a pupil position and transmit external light. In this case, so-called AR (Augmented Reality) viewing becomes possible.

In still another aspect, in the prism, the first surface, the second surface, and the third surface are free curved surface. In this case, the entire optical system including the prism can be miniaturized.

In still another aspect, the projection lens has a free curved surface as an optical surface. In this case, high accuracy of the projection lens can be achieved.

In yet another aspect, the projection lens, the prism and the mirror member form an off-axis optical system. In this case, it is possible to miniaturize the optical system while maintaining the resolution, and thus to miniaturize the entire apparatus.

In still another aspect, a Z-shaped light path is formed by a two-step folding obtained by folding the light path at the third surface of the prism and at the mirror member. In this case, the apparatus can be miniaturized by bending the light path in a Z-shape.

In yet another aspect, the image displayed on the display element has distortion that cancels the distortion generated by the projection lens, the prism, and the mirror member. In this case, it is possible to suppress aberration as a whole including the display element while allowing distortion aberration generated in the mirror member or the like.

In still another aspect, the first surface has a curved surface that is convex toward the projection lens.

An optical unit according to a specific aspect, includes a projection lens configured to converge image light emitted from a display element, a prism configured to guide the image light emitted from the projection lens, and a mirror member configured to reflect, toward a pupil position, the image light emitted from the prism, wherein the prism includes a first surface where the image light from the projection lens is incident while being transmitted, a second surface at which the image light that passed through the first surface is reflected, and a third surface at which the image light that passed through the second surface is reflected toward the second surface, and the image light reflected at the third surface is emitted while being transmitted through the second surface.

In the optical unit, in the prism having the first surface to the third surface, the image light emitted from the projection lens first is incident while being transmitted at the first surface, is then reflected at the second surface, is further reflected at the third surface to be directed toward the second surface again, and is emitted while being transmitted through the second surface. This makes it possible to increase the number of surfaces on which aberration can be corrected without increasing the size of the optical system and to improve the resolution performance, as compared with, for example, an aspect in which only light is transmitted through a prism or only one internal reflection is performed by a prism in addition to the transmission.

What is claimed is:

1. A virtual image display device, comprising:
   a display element;
   a projection lens configured to converge image light emitted from the display element;
   a prism configured to guide the image light emitted from the projection lens; and
   a mirror member configured to reflect, toward a pupil position, the image light emitted from the prism; wherein
   the prism includes
   a first surface where the image light from the projection lens is incident while being transmitted,
   a second surface at which the image light that passed through the first surface is reflected, and
   a third surface at which the image light reflected from the second surface is reflected toward the second surface,
   the image light reflected at the third surface is emitted while being transmitted through the second surface,
   the second surface includes a reflective area that only reflects the image light and a transmissive area that only transmits the image light, and
   the reflective area is provided at a position closer to the projection lens than the transmissive area.

2. The virtual image display device according to claim 1, wherein
   at the second surface, the prism reflects, by total reflection, the image light that passed through the first surface.

3. The virtual image display device according to claim 1, wherein,
   of the second surface, a reflective area that reflects the image light has a concave shape, and
   the third surface has a concave shape.

4. The virtual image display device according to claim 1, wherein an overlapping area of the reflective area that reflects the image light and a transmissive area that transmits the image light, exists in the second surface.

5. The virtual image display device according to claim 1, wherein
   the prism has a laminated structure in which members having different refractive indexes are combined.

6. The virtual image display device according to claim 5, wherein
   the prism forms the second surface with a high refractive member having a relatively high refractive index.

7. The virtual image display device according to claim 1, wherein
the mirror member is a see-through mirror configured to reflect the image light emitted from the prism toward a pupil position and transmit external light.

8. The virtual image display device according to claim 1, wherein,
in the prism, the first surface, the second surface, and the third surface are free curved surfaces.

9. The virtual image display device according to claim 1, wherein
the projection lens has a free curved surface as an optical surface.

10. The virtual image display device according to claim 1, wherein
the projection lens, the prism, and the mirror member form an off-axis optical system.

11. The virtual image display device according to claim 1, wherein
a Z-shaped light path is formed by a two-step folding obtained by folding the light path at the third surface of the prism and at the mirror member.

12. The virtual image display device according to claim 1, wherein
the image displayed on the display element has distortion that cancels distortion generated by the projection lens, the prism, and the mirror member.

13. The virtual image display device according to claim 1, wherein
the first surface has a curved surface having a convex shape toward the projection lens.

14. The virtual image display device according to claim 1, wherein the first surface has a first portion having a convex shape toward the projection lens and a second portion that is flat, with the first portion coupled to the second surface and the second portion coupled to the third surface.

15. An optical unit comprising:
a projection lens configured to converge image light emitted from a display element;
a prism configured to guide the image light emitted from the projection lens; and
a mirror member configured to reflect, toward a pupil position, the image light emitted from the prism; wherein
the prism includes
a first surface where the image light from the projection lens is incident while being transmitted,
a second surface at which the image light that passed through the first surface is reflected, and
a third surface at which the image light reflected from the second surface is reflected toward the second surface,
the image light reflected at the third surface is emitted while being transmitted through the second surface,
the second surface includes a reflective area that only reflects the image light and a transmissive area that only transmits the image light, and
the reflective area is provided at a position closer to the projection lens than the transmissive area.

16. The optical unit according to claim 15, wherein the first surface has a first portion having a convex shape toward the projection lens and a second portion that is flat, with the first portion coupled to the second surface and the second portion coupled to the third surface.

* * * * *